(12) United States Patent
Hsieh

(10) Patent No.: US 7,840,791 B2
(45) Date of Patent: Nov. 23, 2010

(54) RESET DEVICE FOR COMPUTER SYSTEM

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 723 days.

(21) Appl. No.: 11/782,656

(22) Filed: Jul. 25, 2007

(65) Prior Publication Data

US 2008/0148035 A1 Jun. 19, 2008

(30) Foreign Application Priority Data

Dec. 19, 2006 (CN) .................... 2006 1 0201332

(51) Int. Cl.
*G06F 9/00* (2006.01)
*G06F 15/177* (2006.01)

(52) U.S. Cl. .................. 713/1; 713/2; 714/15
(58) Field of Classification Search .............. 713/1, 713/2; 714/15
See application file for complete search history.

(56) References Cited

U.S. PATENT DOCUMENTS

| 5,842,012 | A | | 11/1998 | Walker | |
|---|---|---|---|---|---|
| 5,867,676 | A | * | 2/1999 | Nguyen et al. | 710/305 |
| 7,159,107 | B2 | * | 1/2007 | Chen et al. | 713/2 |
| 7,472,203 | B2 | * | 12/2008 | Adamson et al. | 709/253 |
| 2005/0023996 | A1 | * | 2/2005 | Adamson et al. | 315/293 |
| 2006/0036888 | A1 | * | 2/2006 | Warren et al. | 713/600 |
| 2007/0283136 | A1 | * | 12/2007 | Hsieh | 713/1 |

* cited by examiner

*Primary Examiner*—Vincent T Tran
(74) *Attorney, Agent, or Firm*—Frank R. Niranjan

(57) ABSTRACT

A reset device for a computer system is provided. The reset device includes a hardware-reset signal generating circuit for outputting a hardware-reset signal to reset the computer system; a switch connected to the hardware-reset signal generating circuit, the hardware-reset signal generating circuit outputting the hardware-reset signal when the switch is on; a timing circuit set for outputting a controlling signal after a predetermined time that the switch has been on has passed; and a latch circuit communicating with a central processing unit (CPU) of the computer system and the timing circuit, the latch circuit latching the controlling signal and delivering the controlling signal to the CPU, the CPU controlling system settings to resume default values based on the controlling signal.

11 Claims, 2 Drawing Sheets

RESET DEVICE FOR COMPUTER SYSTEM

BACKGROUND OF THE INVENTION

1. Field of the Invention

The present invention relates to computer systems, and particularly to a reset device for a computer system.

2. Description of Related Art

Hardware-reset signal generating devices are used in computer systems. When a failure in a computer system occurs and the computer system hangs, the user can turn on (press down) a button switch set in a panel of the computer, the hardware-reset signal generating device thereby generates a hardware-reset signal, causing the computer system to reset.

Referring to FIG. 2, a conventional hardware-reset signal generating device includes a hardware-reset signal generating circuit 100 and a button switch S1. The hardware-reset signal generating circuit 100 includes a resistor R1, a diode D1, a capacitor C1, and a reference voltage Vcc. The diode D1 and the resistor R1 are connected in parallel to each other but in series with the capacitor C1 between the reference voltage Vcc and ground with a cathode of the diode D1 connected to the reference voltage Vcc and an anode of the diode D1 connected to the capacitor C1. The button switch S1 is connected between the resistor R1 and ground. A node RESETn between the diode D1 and the capacitor C1 acts as a terminal for outputting a hardware-reset signal. When the button switch S1 is turned off, the voltage at the terminal is at a high level, and the system works normally. When the button switch S1 is turned on, the voltage at the terminal goes to a low level, and the hardware-reset signal is generated and output to some chipsets of the computer, e.g., a central processing unit and a north bridge, resetting the computer system.

A computer in a communication network has an Internet protocol address. If the computer hangs, the Internet protocol address and related network settings may be changed. If the Internet protocol address and related network settings change, even though the user turns on the button switch S1, the Internet protocol address and related network settings cannot resume default values and the computer cannot connect with the communication network.

What is needed, therefore, is a reset device for a computer system, which makes system settings, resume default values.

SUMMARY OF THE INVENTION

A reset device for a computer system is provided. In a preferred embodiment, the reset device includes a hardware-reset signal generating circuit for outputting a hardware-reset signal to reset the computer system; a switch connected to the hardware-reset signal generating circuit, the hardware-reset signal generating circuit outputting the hardware-reset signal when the switch is on; a timing circuit set for outputting a controlling signal after a predetermined time that the switch has been on has passed; and a latch circuit communicating with a central processing unit (CPU) of the computer system and the timing circuit, the latch circuit latching the controlling signal and delivering the controlling signal to the CPU, the CPU controlling system settings to resume default values based on the controlling signal.

Other advantages and novel features will become more apparent from the following detailed description when taken in conjunction with the accompanying drawings, in which:

DETAILED DESCRIPTION OF THE INVENTION

Figure 1:
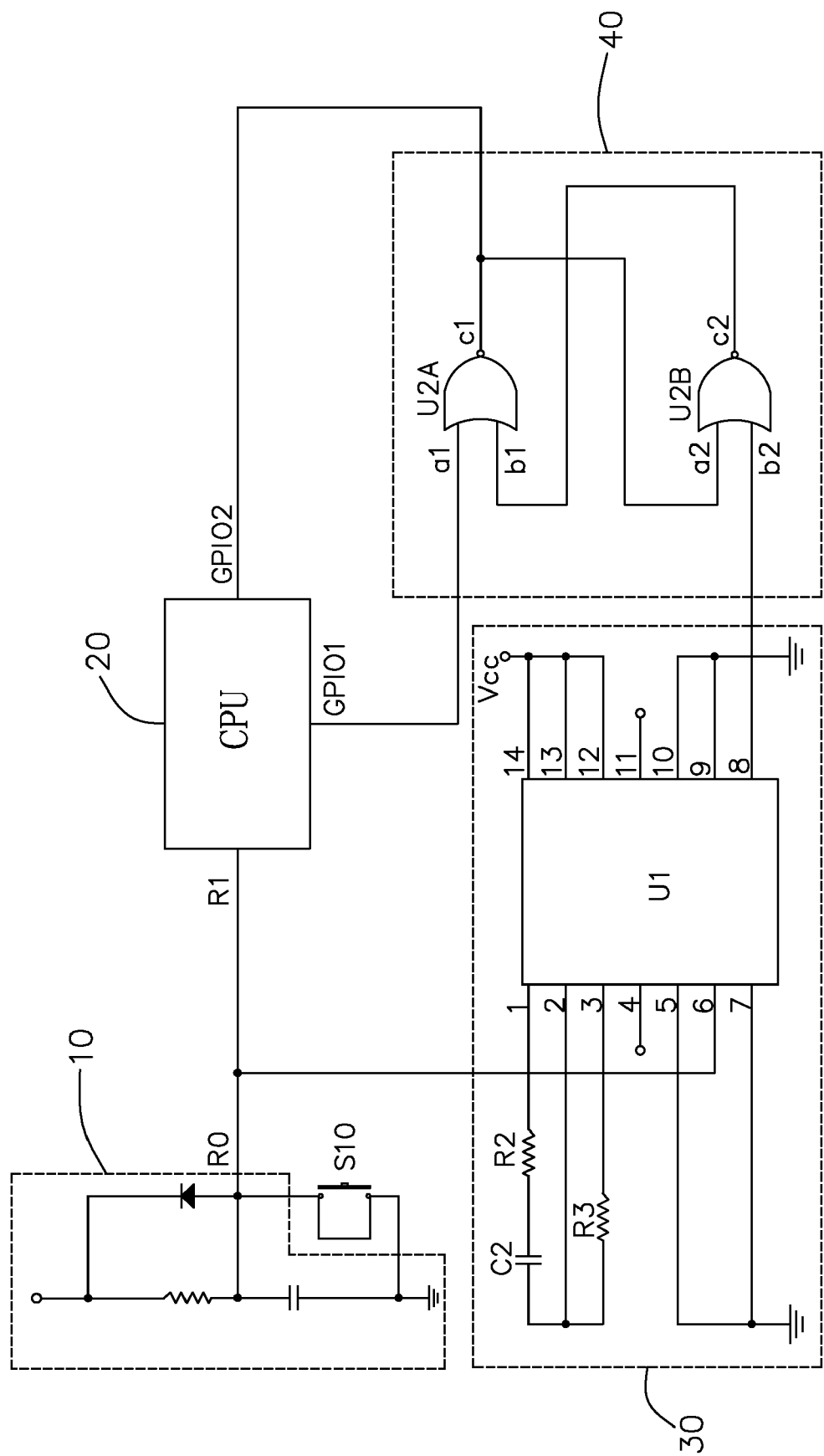
FIG. 1 is a circuit diagram of a reset device for a computer system, in accordance with an embodiment of the present invention.
Figure 2:
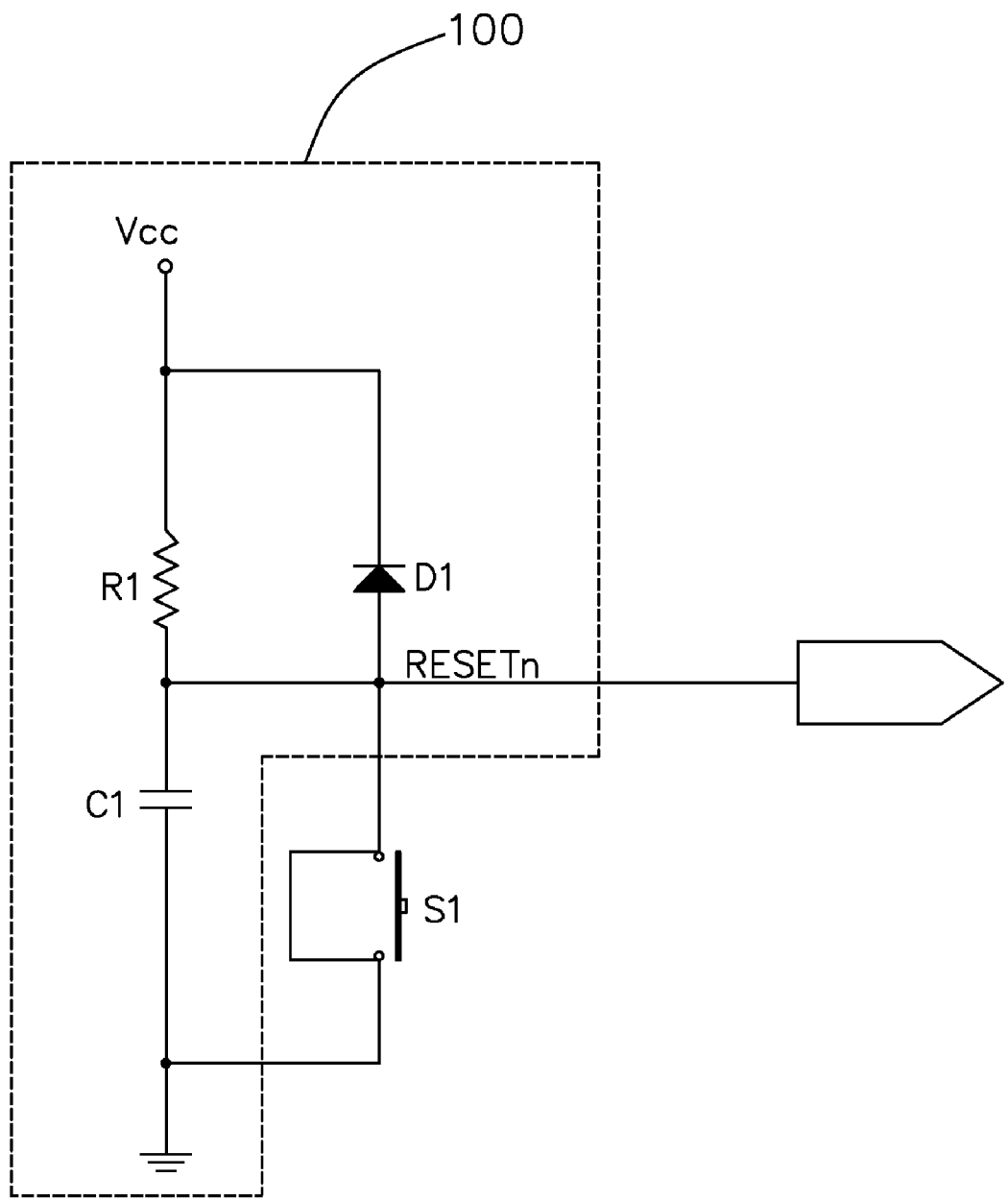
FIG. 2 is a circuit diagram of a conventional hardware-reset signal generating device.

Referring to FIG. 1, a reset device for a computer system in accordance with an embodiment of the present invention includes a hardware-reset signal generating circuit 10, a switch S10, a central processing unit (CPU) 20, a timing circuit 30, and a latch circuit 40. When a button of the switch S10 is pressed down, the switch S10 is on, and an output R0 of the circuit 10 outputs a low-level signal serving as a hardware-reset signal. A reset pin R1 of the CPU 20 receives the hardware-reset signal to reset the computer system. When the button of the switch S10 is released, the output R0 of the circuit 10 outputs a high-level signal.

The timing circuit 30 includes a timer U1, resistors R2, R3, and a capacitor C2. The resistor R2, the capacitor C2, and the resistor R3 are connected in series between a pin 1 and a pin 3 of the timer U1. A node between the capacitor C2 and the resistor R3 is connected to a pin 2 of the timer U1. Pins 4, 11 of the timer U1 are null (no terminator). Pins 5, 7, 9, and 10 of the timer U1 are connected to ground. Pins 12, 13, and 14 of the timer U1 are connected to a reference voltage Vcc. Pin 6 of the timer U1 is connected to the output R0 of the circuit 10.

The latch circuit 40 includes a first nor gate U2A and a second nor gate U2B. The first nor gate U2A has an input a1 connected to an input/output port GPIO1 of the CPU 20, an input b1, and an output c1 connected to an input/output port GPIO2 of the CPU 20. The second nor gate U2B has an input a2 connected to the output c1 of the first nor gate U2A, an input b2 connected to pin 8 of the timer U1, and an output c2 connected to the input b1 of the first nor gate U2A. A truth table of the latch circuit 40 is as follows:

| inputs | | outputs | |
| --- | --- | --- | --- |
| b2 | a1 | c1 | c2 |
| high | low | high | low |
| *low | low | high | low |
| low | high | low | high |
| *low | low | low | high |
| high | high | low | low |

Wherein the asterisks indicates that when both inputs b2, a1 are low, if the preceding values of the inputs b2, a1 were respectively high and low, the outputs c1, c2 will respectively be high and low. If the preceding values of the inputs b2, a1 were respectively low and high, the outputs c1, c2 will respectively be low and high.

The timing circuit 30 is used to set a predetermined time T. When pin 6 of the timer U1 receives a low-level signal for a time equal to or greater than the predetermined time T, namely the switch S10 is on for a time equal to or greater than the predetermined time T, pin 8 of the timer U1 outputs a high-level signal. In contrast, when pin 6 of the timer U1 receives the low-level signal for a time less than the predetermined time T, namely the switch S10 is on for a time less than the predetermined time T or the switch S10 is off, pin 8 of the timer U1 outputs a low-level signal.

After the computer system is powered up, pin 8 of the timer U1 outputs a low-level signal to the input b2, and the CPU 20 is programmed to output a high-level signal to the input a1. The output c1 outputs a low-level signal according to the truth table. Then the CPU 20 outputs a low-level signal to the input a1. The output c1 continues to output the low-level signal according to the truth table.

If the computer system needs to be reset but the system settings do not need to resume default values, the button of the switch S10 is pressed down for a time less than the predetermined time T. The circuit 10 outputs a low-level signal to the reset pin R1 of the CPU 20, for resetting the computer system. Pin 8 of the timer U1 still outputs a low-level signal to the input b2. The CPU 20 is programmed to output a high-level signal to the input a1. The output c1 outputs a low-level signal according to the truth table. Then the CPU 20 outputs a low-level signal to the input a1. The output c1 continues to output the low-level signal according to the truth table.

If the computer system needs to be reset, and system settings need to resume default values, the button of the switch S10 is pressed down for a time greater than or equal to the predetermined time T. The hardware-reset signal generating circuit 10 outputs a low-level signal to the reset pin R1 of the CPU 20, resetting the computer system. Pin 8 of the timer U1 outputs a high-level signal to the input b2. The output c1 outputs a high-level signal according to the truth table. When the button of the switch S10 is released, the hardware-reset signal generating circuit 10 outputs a high-level signal to pin 6 of the timer U1. Pin 8 of the timer U1 thus outputs a low-level signal to the input b2. The output c1 keeps outputting the high-level signal according to the truth table. The CPU 20 receives the high-level signal and controls the system settings to resume default values. After the system settings have resumed, the CPU 20 is programmed to output a high-level signal to the input a1. The output c1 outputs a low-level signal instead of the high-level signal according to the truth table. Then the CPU 20 outputs a low-level signal to the input a1. The output c1 continues outputting the low-level signal according to the truth table. The system settings do not resume default values.

In view of the foregoing, when the button of the switch S10 is pressed down for the time less than the predetermined time T, the computer system resets and no default value is resumed. When the button of the switch S10 is pressed down for the time equal to or greater than the predetermined time T, the computer system resets, and system settings resume default values.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A reset device for a computer system, the reset device comprising:
    a hardware-reset signal generating circuit for outputting a hardware-reset signal to reset the computer system;
    a switch connected to the hardware-reset signal generating circuit, the hardware-reset signal generating circuit outputting the hardware-reset signal when the switch is on;
    a timing circuit set for outputting a controlling signal after a predetermined time that the switch has been on has passed;
    a latch circuit communicating with a central processing unit (CPU) of the computer system and the timing circuit, the latch circuit latching the controlling signal and delivering the controlling signal to the CPU, the CPU controlling system settings to resume default values based on the controlling signal;
    wherein the timing circuit comprises a timer, with a first resistor, a capacitor and a second resistor connected in series between a first pin and a second pin of the timer in that order, a node between the capacitor and the second resistor is connected to a third pin of the timer.

2. The reset device as claimed in claim 1, wherein the system settings comprise an Internet protocol address and related network settings.

3. The reset device as claimed in claim 1, wherein the latch circuit comprises a first nor gate and a second nor gate, the first nor gate has a first input and an output connected to the CPU, and a second input connected to an output of the second nor gate, the second nor gate has a first input connected to the output of the first nor gate, and a second input connected to the timing circuit.

4. The reset device as claimed in claim 3, wherein the CPU comprises a reset pin for receiving the hardware-reset signal outputted by the hardware-reset signal generating circuit, a first input/output port connected to first input of the first nor gate, and a second input/output port connected to the output of the first nor gate.

5. A computer system comprising:
    a hardware-reset signal generating circuit having an output for outputting a hardware-reset signal to reset the computer system;
    a switch connected to the hardware-reset signal generating circuit, the hardware-reset signal generating circuit outputting the hardware-reset signal when the switch is on;
    a timing circuit set for outputting a controlling signal after a predetermined time, that the switch has been on, has passed;
    a central processing unit (CPU) comprising a reset pin for receiving the hardware-reset signal;
    a latch circuit communicating with the CPU and the timing circuit, the latch circuit latching the controlling signal and delivering the controlling signal to the CPU, the CPU controlling system settings to resume default values based on the controlling signal and then providing a reset signal for the latch circuit to disable the controlling signal;
    wherein the latch circuit comprises a first nor gate and a second nor gate, the first nor gate has a first input and an output connected to the CPU, and a second input connected to an output of the second nor gate, the second nor gate has a first input connected to the output of the first nor gate, and a second input connected to the timing circuit.

6. The computer system as claimed in claim 5, wherein the system settings comprise an Internet protocol address and related network settings.

7. The computer system as claimed in claim 5, wherein the timing circuit comprises a timer, with a first resistor, a capacitor, and a second resistor, connected in series between a first pin and a second pin of the timer in that order, a node between the capacitor and the second resistor is connected to a third pin of the timer, the timer connected to the output of the hardware-reset signal generating circuit.

8. The computer system as claimed in claim 5, wherein the CPU further comprises a first input/output port connected to first input of the first nor gate, and a second input/output port connected to the output of the first nor gate.

9. A computer system comprising:
   a central processing unit (CPU) comprising a reset pin;
   a hardware-reset signal generating circuit for outputting a hardware-reset signal to the reset pin of the CPU to reset the computer system;
   a switch connected to the hardware-reset signal generating circuit, the hardware-reset signal generating circuit outputting the hardware-reset signal when the switch is on;
   a timing circuit set at a predetermined time and capable of outputting a controlling signal in response to a comparing result between the time that the switch has been on and the predetermined time;
   a latch circuit communicating with the CPU and the timing circuit configured to deliver the controlling signal to the CPU, the CPU controlling system settings to resume default values or not based on the controlling signal;
   wherein the controlling signal disables the CPU control system settings to resume default values if the time that the switch has been on is less than the predetermined time.

10. The computer system as claimed in claim 9, wherein the controlling signal enables the CPU control system settings to resume default values if the time that the switch has been on is equal to or greater than the predetermined time.

11. The computer system as claimed in claim 9, wherein the timing circuit comprises a timer connected to an output of the hardware-reset signal generating circuit from which the hardware-reset signal is output.

* * * * *